United States Patent [19]

Evans et al.

[11] Patent Number: 4,504,840

[45] Date of Patent: Mar. 12, 1985

[54] THERMAL PRINTING WITH INK REPLENISHMENT

[75] Inventors: Julie F. Evans; Hugh T. Findlay, both of Lexington; Stephen A. Popyach, Harrodsburg; Deh C. Tao, Lexington, all of Ky.

[73] Assignee: International Business Machines Corporation, Armonk, N.Y.

[21] Appl. No.: 479,614

[22] Filed: Mar. 28, 1983

[51] Int. Cl.[3] ........................................ G01D 15/10

[52] U.S. Cl. ........................... 346/76 PH; 400/120; 400/196.1; 400/197

[58] Field of Search ............... 346/76 PH, 140 R, 1.1; 400/197, 198, 199, 196.1, 120, 702

[56] References Cited

U.S. PATENT DOCUMENTS

| | | | |
|---|---|---|---|
| 3,377,598 | 4/1968 | Borman | 400/197 X |
| 3,963,340 | 6/1976 | Gerace | 355/3 R |
| 3,989,131 | 11/1976 | Knirsch et al. | 346/76 X |
| 4,236,834 | 12/1980 | Hafer et al. | 400/120 |
| 4,253,775 | 3/1981 | Crooks et al. | 400/198 |
| 4,350,449 | 9/1982 | Countryman et al. | 400/120 |
| 4,427,985 | 1/1984 | Kikuchi | 346/76 PH X |

OTHER PUBLICATIONS

*IBM Technical Disclosure Bulletin,* "Multi-Hue Ribbon Manufacturing Process," by W. Goff, Jr., et al., vol. 25, No. 4, Sep. 1982, at pp. 2151-2152.

*Primary Examiner*—Joseph W. Hartary
*Attorney, Agent, or Firm*—John A. Brady

[57] ABSTRACT

A reinking thermal printer is disclosed having a continuous band 1 receiving ink lamination 23 from supply 21. Ink supply 21 has a lamination 25 which is stripped from the ink lamination 23 and directed through guide slot 43. Ink lamination 23 is transferred to band 1 at rolls 29 and 31. The reinked band 1 is then printed from by thermal printing element 7. Lamination 25 enters rolls 35 and 37 with its rough side encountering the remaining ink on band 1 to effect cleaning. Lamination 25 is then stuffed in chamber 39.

22 Claims, 1 Drawing Figure

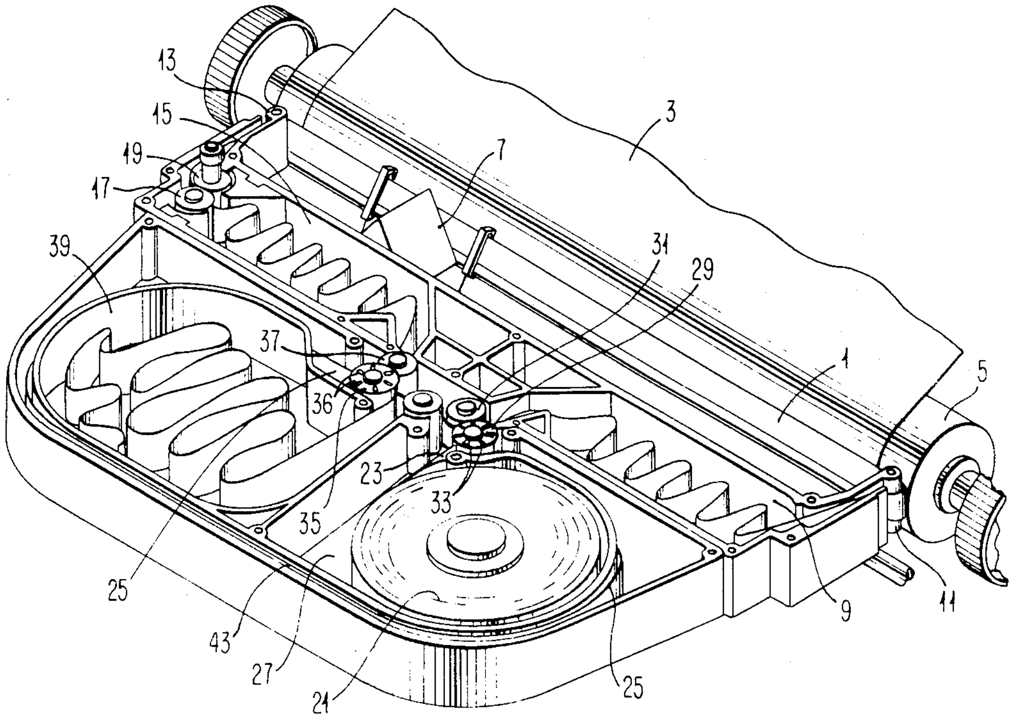
13
15
19
17
39
3
7
31
29
37
36
1
5
23
33
35
25
9
11
43
27
21
25

THERMAL PRINTING WITH INK REPLENISHMENT

DESCRIPTION

Cross Reference to Related Application

An application entitled "Self-Supporting Thermal Ink", U.S. Ser. No. 479,613, filed the same day as this application by H. T. Findlay and L. M. Rood discloses ink which is the preferred ink in the embodiment disclosed in this application.

1. Technical Field

This invention relates to ink replenishment in a non-impact, thermal printing system employing heating of a transfer ribbon. Ink is transferred from the ribbon to paper at localized areas at which heat is generated. Localized heating may be obtained, for example, by contacting a resistive ribbon with point electrodes and a broad area contact electrode. The high current densities in the neighborhood of the point electrodes during an applied voltage pulse produce intense local heating which causes transfer of ink from the ribbon to paper or other substrate in contact with the ribbon.

2. Background Art

Reinking is a standard design option in the printer art. U.S. Pat. No. 4,253,775 to Crooks et al is directed to certain apparatus for achieving reinking in a thermal printing system of the kind the preferred embodiment of invention employs. The ribbon substrate is a polyimide filled with conductive particles, graphite in that particular patent, and a polyimide is the material of the substrate of the preferred form of this invention. The ink being applied for reinking is applied as a powder, liquid, or the like and then treated so as to be smoothed out as an suitable ink layer.

U.S. Pat. No. 4,236,834 to Hafer et al describes an endless belt having the characteristics of a resistive ribbon. The patent specifically mentions polyimide filled with carbon as a material for the resistive layer of that endless belt. Polyimide is the material for the resistive layer of the preferred embodiment of this invention. In that patent, the endless belt is moved while a heat sensitive paper is brought in contact with the belt and printed upon using the characteristics of the paper to bring out images, rather than using an ink layer. U.S. Pat. No. 4,350,449 to Countryman et al is illustrative of resistive ribbon printing in which ink is transferred onto ordinary paper and the like.

U.S. Pat. No. 3,963,340 to Gerace is illustrative of teachings in which characters or other images are applied from an ink ribbon and transported on a continuous band to a printing station, where they are completely transferred. Thermal printing embodiments are included. This patent does also teach a cleaning station (FIG. 7A) with scraper blade for cleaning the printing band after it leaves the printing station.

U.S. Pat. No. 3,377,598 to Borman teaches the transporting of an ink which is printed by an explosive effect from localized heating. The ink may be heated at the supply and applied to a continuous band at nip rollers. Other nip rollers are taught which are cooled by heat-radiating fins. The continuous band is a mesh screen.

The preferred embodiment of this invention has a printhead carrying electrodes for printing mounted on a carrier which traverses across a span of printing ribbon which extends across most of the width of the typical paper being printed upon. This general configuration is a standard design alternative. U.S. Pat. No. 3,989,131 to Knirsch et al is an illustrative of teaching of such an overall system.

A major aspect of this invention is in the use of a lamination of ink applied to the thermal ribbon substrate to achieve reinking. This is done by bringing the two in contact, and it may be assisted by applying heat at the point of contact. An article entitled "Multi-Heu Ribbon Manufacturing Process" by W. Goff, Jr. et al at the *IBM Technical Disclosure Bulletin,* Vol. 25, No. 4, September 1982, at pp. 2151–2152, describes a transfer of ink from a lamination to a substrate using rolls and such differential temperature. This is described as part of a ribbon manufacturing process, not as a function in a reinking printing system.

DISCLOSURE OF THE INVENTION

In accordance with this invention, an overall design for a reinking printing system employing thermal technology is achieved in which the resupply item is also a ribbon. The supply ink is provided as a spool or the like and transfer of a continuous body of the supply ink to a resistive, reused ribbon is by pressure engagement. Transfer may be aided by heating. Typically, for inking, heating will be at the receiving side, since heat-softened ink would tend to stay on elements it contacts on the supply side.

The resupply ink lamination may be self-supporting, but typically will be wound with an intermediate, release material. A self-supporting ink is stripped from the release material and brought alone into engagement with the conductive layer. Where the ink is not sufficiently cohesive, the lamination is not stripped away prior to a transfer of the ink to the conductive layer. In the more preferred aspects of the printer system, the intermediate material is directed to a location past the printing station and is used as an element to assist in fully cleaning the printing ribbon.

The printing ribbon is a continuous band used to apply heat at a print station to ink on one side of the band in a pattern of heat produced from a printhead on the other side of the band. Ink in the form of a lamination wide enough to print any character to be printed is brought up to the band and pressed into contact with it. The ink is thereby transferred to the outer surface of the band and, as the band moves, that ink is brought to a print station at which the printhead will melt selected parts of that ink to effect printing. The band then moves to a second station at which cleaning of the entire band is achieved.

Although rotating brush cleaners and the like are within the concepts of this invention, the preferred aspects employ bringing to the cleaning station a substrate material which has a preference for the ink. The front of the substrate carried or at least contacted the laminations of ink when the ink is initially supplied for use. Preferably, the back of the substrate has a preference for the ink, which may be achieved, for example, by the back having a rough texture. The back of the substrate, after having supplied ink, is brought into contact with the remaining ink using pressure, preferably assisted by heat applied to the printer band side of the lamination. The substrate is then collected in a receiving area for ultimate disposal.

Significant economies are realized since only the ink need be replaced, rather than the entire thermal printer ribbon. Thermal printers have the potential of printing very quickly, and, accordingly, this avoids the potential of large number of changes of the entire ribbon system. Full cleaning of the ribbon prior to reinking offers the potential of consistently achieving uniform, high-quality of printing.

BRIEF DESCRIPTION OF THE DRAWING

A preferred embodiment of this invention as well as a general discussion of aspects of the preferred embodiment are described in detail with reference to the accompanying drawing in which:

The drawing is a perspective view of aspects pertinent with respect to this invention of the printing system as a whole and showing the ribbon and stations within the printer of significance to this invention.

BEST MODE FOR CARRYING OUT THE INVENTION

As shown in FIG. 1, the printer has a continuous, endless, reuseable printer ribbon band 1 which extends in a straight expanse across the entire width of an area to effect printing. Paper 3 or the like to be printed upon is held in proximity to the expanse of ribbon 1 by being backed as conventional with a platen 5, which may be flat or round as desired for a particular purpose. A printing element 7 moves across the width of the line being printed upon, as is conventional, and generates heat in selected areas corresponding to the image to be produced.

It will be apparent that this invention is not dependent upon the type of thermal printing effected. The heat could be generated in print element 7 with ribbon 1 serving only as a support and as a heat conductor to ink on its outer surface. The preferred form conceived, however, employs resistive ribbon technology such as disclosed in, for example, the above-mentioned U.S. Pat. No. 4,350,449 to Countryman et al, in which the ribbon has a resistive layer and the printhead comprises electrodes which supply current to the resistive layer. The resistive characteristics of the ribbon generate heat within the ribbon. This heat is in close proximity to the ink carried on the ribbon and achieves excellent quality printing.

The printer of this embodiment has a chamber 9 on the supply side of the print element 7 for ribbon 1 in which ribbon 1 is loosely held. Ribbon 1 is then directed out of chamber 9 across a vertical guide 11 to begin a straight reach across the width of paper 3 to be printed on. It is guided back by vertical guide 13 into supply chamber 15. Feed rolls 17 and 19, at the entrance to chamber 15, turn to provide a driving force to move the ribbon 1 as required. Chamber 15 also loosely holds ribbon 1, thereby providing slack between points at which the ribbon is positively driven by feed rolls 17 and 19 and other rolls as will be described.

Ink supply 21 comprises a spool of solid ink which is thermally meltable in the printing operation. That ink has an ink lamination 23 of width generally slightly less than the width of ribbon 1. Ink supply 21 has a lamination 25 which may be of synthetic polymer, kraft paper or the like. Lamination 25 has a smooth side on the side facing that side of the printer ribbon 1 which will be the printing side and having a rough surface on the opposite side.

More specifically, intermediate lamination 25 is preferably a 10 microns thick ordinary polyethylene film. The roughened surface may be obtained by chemical etching, grit blasting controlled in impact so as not to injure the film, or by other surface treatment. An ordinary polyethylene terephthalate film may be as thin as 6 microns and appears to clean satisfactorily without special roughening of the surface use to clean.

The spooled ink supply 21 is mounted in chamber 27 and is unspooled into the nip of two rolls 29 and 31, which are at the entrance of chamber 9. The lamination 25 is shown stripped from the ink lamination 23 prior to entrance between the rolls 29 and 31. This assumes that the ink is self-supporting, which is preferably the case. The preferred, self-supporting ink is described in the application mentioned at the first paragraph of this application entitled "Self-Supporting Thermal Ink," which application is herein incorporated by reference.

Nip roll 31 contains a small resistive heater or the equivalent to moderately heat the roll, while roll 29 is largely hollow and has internal fins 33 or the like so as to remain close to room temperature. This provides softening by heat which causes the ink to tend to adhere to printer ribbon 1. The primary mechanism for such adherence, particularly where the substrate has been separated prior to entering the rolls 29 and 31, is simply in the pressure applied and the inherent adhesive attraction of a pliable ink to the surface of the reuseable ribbon, which surface in the preferred implementation is a metal conductive layer of nickel, as is discussed below. Roll 29 is kept cool because ink 21 softened by heat would tend to stay on the surface of roller 29.

Rolls 29 and 31 are rotatably driven as the printer ribbon 1 is fed by rolls 15 and 19. Both ink supply lamination 23 and ribbon 1 are advanced by the turning action of rolls 29 and 31. Ink from supply 21 is transferred to ribbon 1 in chamber 9, where it is ready for use in printing.

Simultaneously with each such movement of ribbon 1, nip rolls 35 and 37 at the entrance of a takeup chamber 39 are also driven to provide the same amount as ribbon movement. Nip roll 37 is internally heated, and nip roll 35 is hollow with internal cooling fins 36 so as to remain near room temperature. Internal paper lamination 25 of supply 21 is guided across the printer through guide slot 43 and is brought into the nip rolls 35 and 37. The rough, back surface of film lamination 25 encounters the outside of the ink side of ribbon 1. The heating at roll 37 causes a differential effect which causes the ink to tend to adhere to lamination 27. That ink which remains after printing transfers fully to the lamination and is stuffed into a chamber 39. Ultimately the contents of chamber 39 are discarded as waste. If necessary, brush cleaning in the area of rollers 35 and 37 may also be effective.

A highly effective and economical printer system is thereby achieved. Printing can be at high speeds, limited only by the technology of printing involved at the printing station. The cleaning effect provides a ribbon which is useful over a long period to produce high-quality images.

Preferrably, the reuseable ribbon 1 has a resistive layer of polyimide filled with conductive carbon to provide resistivity of 300 to 1500 ohms per square. More specifically, 500 ohms per square at a thickness of 37 microns is preferred. This lamination is then followed by a second lamination of about 100 angstroms thick, silicon dioxide, applied by any conventional technique. This silicon dioxide is essentially as described in U.S. patent application Ser. No. 4,419,024 entitled "Intermediate Layer Of Thermal Transfer Medium," to P. A. Bowlds et al, filed Dec. 22, 1981, and herein incorporated by reference. A highly conductive intermediate layer is also required in the resistive ribbon printing to serve as a ground return path. Accordingly, the third lamination in resistive ribbon 1 is a layer of 100 angstroms thick layer of pure nickel applied by vacuum deposition. Other not-easily-oxidized, high-melt-temperature metals could be used for the nickel. As the nickel layer is subject to repeated abrasion at the cleaning station of the printer, a preferably very thin protective lamination is preferably applied as the final layer. This is an unfilled polyimide or other material compatible with the resistive layer of a thickness of less than two microns.

It will be apparent that practical systems may take various forms, while still within the spirit and scope of the invention as herein described.

What is claimed is:

1. A thermal printer for printing from an ink which is heated to a flowable state to effect printing, said printer having a continuous band to apply heat to effect said flowable state on selected area of said ink, a print station to generate said heat in selectable patterns to effect printing, an ink supply separate from said band having said ink in a lamination folded on itself to be unfolded as said lamination is supplied for printing, means to supply said ink by transporting said ink into heat conductive relationship with said band for printing in any of said patterns at said print station; and means to effect printing in selected ones of said patterns at said print station from said band by producing said flowable state followed by resupply to said band from said ink supply by said means to supply said ink.

2. A thermal printer as in claim 1 in which said ink supply is a spool of ink having an internal, continuous lamination separating said lamination of said ink.

3. A thermal printer as in claim 2 in which said ink lamination is fed from said spool between nip rolls at which the said ink lamination is pressed into adherence with said band.

4. A thermal printer as in claim 1 in which subsequent to said printing said continuous band enters a cleaning station at which substantially all unused ink is cleaned from said continuous band prior to said resupply.

5. A thermal printer as in claim 2 in which subsequent to said printing said continuous band enters a cleaning station at which substantially all unused ink is cleaned from said continuous band prior to said resupply.

6. A thermal printer as in claim 3 in which subsequent to said printing said continuous band enters a cleaning station at which substantially all unused ink is cleaned from said continuous band prior to resupply.

7. A combination as in claim 5 in which said internal, continuous lamination is fed to said cleaning station and said cleaning is effected by nip rolls bringing said lamination in direct contact with said unused ink.

8. A combination as in claim 6 in which said internal, continuous lamination is fed to said cleaning station and said cleaning is effected by nip rolls bringing said lamination in direct contact with said unused ink.

9. A combination as in claim 7 in which said internal, continuous lamination is a polymer film having a rough side and said rough side is brought into said direct contact with said unused ink.

10. A combination as in claim 8 in which said internal, continuous lamination is a polymer film having a rough side and said rough side is brought into said direct contact with said unused ink.

11. A thermal printer for printing from an ink which is heated to a flowable state to effect printing, said printer having a continuous band to apply heat to effect said flowable state on selected areas of said ink, a print station to generate said heat in predetermined patterns, an ink supply separate from said band having said ink all in a continuous, elongated body at least of size to cover the largest of said patterns, means to supply said ink by transporting said continuous body onto said surface of said continuous band for printing in any of said patterns at said print station, and means to effect printing in selected ones of said patterns at said print station by producing said flowable state followed by resupply to said band from said ink supply by said means to supply said ink.

12. A thermal printer as in claim 11 in which said ink supply is a spool of ink having an internal, continuous lamination separating said lamination of said ink.

13. A thermal printer for printing from an ink which is heated to a flowable state to effect printing, said printer comprising a continuous band to apply heat to effect said flowable state on selected areas of said ink, an ink supply separate from said band having an ink in laminations and having an element separating said laminations, means to separate said element from said ink supply and to apply said ink to said band for printing, and means to transport said element to a cleaning station at which said element is brought into contact with said ink to assist in cleaning ink from said ribbon after printing.

14. A thermal printer as in claim 13 in which said ink supply is a spool of said ink laminations wound with said element.

15. A thermal printer as in claim 14 in which said ink laminations are fed from said spool between nip rolls at which said laminations are pressed into adherence with said band.

16. The thermal printer as in claim 13 in which said element is a polymer film having a front side and a rough, back side, said back side being brought into said contact with said ink to assist in cleaning.

17. The thermal printer as in claim 14 in which said ink supply is a spool of said ink laminations wound with said element.

18. The thermal printer as in claim 15 in which said element is a polymer film having a front side and a rough, back side, said back side being brought into said contact with said ink to assist in cleaning.

19. A method of printing with resupplying of ink comprising:

- stripping said ink from a first substrate, said ink being flowable under heat to effect printing,
- laminating a second substrate with said stripped ink,
- moving said second substrate to a printing station,
- applying heat at said printing station by said second substrate to effect printing in selected one of preselected patterns, and
- contacting said second substrate having ink remaining after said printing with said first substrate after said stripping at a cleaning station to effect transfer of said ink remaining to said first substrate.

20. The method of printing as in claim 19 in which said ink is self-supporting and said stripping is prior to said laminating.

21. The method of printing as in claim 19 in which said contacting is by nip rollers and said first substrate is moved after said stripping by said nip rollers.

22. The method of printing as in claim 20 in which said contacting is by nip rollers and said first substrate is moved after said stripping by said nip rollers.

* * * * *